US011267130B2

(12) United States Patent
Liu et al.

(10) Patent No.: US 11,267,130 B2
(45) Date of Patent: Mar. 8, 2022

(54) ROBOT LOCALIZATION METHOD AND APPARATUS AND ROBOT USING THE SAME

(71) Applicant: UBTECH ROBOTICS CORP LTD, Shenzhen (CN)

(72) Inventors: Hongjian Liu, Shenzhen (CN); Zhichao Liu, Shenzhen (CN); Jian Zhang, Shenzhen (CN); Simin Zhang, Shenzhen (CN); Zhanjia Bi, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 207 days.

(21) Appl. No.: 16/727,948

(22) Filed: Dec. 27, 2019

(65) Prior Publication Data

US 2021/0129341 A1 May 6, 2021

(30) Foreign Application Priority Data

Nov. 6, 2019 (CN) .......................... 201911075523.1

(51) Int. Cl.
*B25J 9/16* (2006.01)
*G01C 21/30* (2006.01)

(52) U.S. Cl.
CPC ........... *B25J 9/1697* (2013.01); *B25J 9/1653* (2013.01); *G01C 21/30* (2013.01)

(58) Field of Classification Search
CPC ..... B25J 9/1697; B25J 9/1653; G01C 21/206; G01C 21/30; G01S 17/89; G01S 17/88; G05D 1/0274; G05D 1/024
See application file for complete search history.

(56) References Cited

U.S. PATENT DOCUMENTS

| 2016/0349362 | A1* | 12/2016 | Rohr ....................... G01C 21/28 |
| 2019/0319851 | A1* | 10/2019 | Eckart .................... H04L 41/142 |
| 2020/0103915 | A1* | 4/2020 | Holz ........................ G06F 16/29 |
| 2020/0202615 | A1* | 6/2020 | Kwon ..................... G06T 11/20 |

OTHER PUBLICATIONS

Perez-Grau,"Multi-sensor three-dimensional Monte Carlo localization for long-term aerial robot navigation", Sep. 2017, International Journal of Advanced Robotic Systems (Year:2017) (Year: 2017).*

* cited by examiner

*Primary Examiner* — Abby Y Lin
*Assistant Examiner* — Dylan M Katz

(57) ABSTRACT

The present disclosure relates to robot technology, and particularly to a robot localization method as well as an apparatus and a robot using the same. The method includes: obtaining a set of particles for localizing the robot; updating a position of each particle in the set of particles based on a preset motion model to obtain the updated position of the particle; obtaining laser measurement data and UWB measurement data; calculating a matching probability of each particle based on the laser measurement data, the UWB measurement data, and the updated position of the particle; and localizing the robot based on the matching probability of each particle. In such a manner, the UWB measurement data is applied to the traditional particle filtering localization algorithm based on laser measurement data so as to enhance the localization precision in large indoor scenes.

15 Claims, 10 Drawing Sheets

ROBOT LOCALIZATION METHOD AND APPARATUS AND ROBOT USING THE SAME

CROSS REFERENCE TO RELATED APPLICATIONS

This application claims priority to Chinese Patent Application No. 201911075523.1, filed Nov. 6, 2019, which is hereby incorporated by reference herein as if set forth in its entirety.

BACKGROUND

1. Technical Field

The present disclosure relates to robot technology, and particularly to a robot localization method as well as an apparatus and a robot using the same.

2. Description of Related Art

In the prior art, most indoor mobile robots use lidar as the main sensor to detect the feature points of the surrounding obstacles, match the created map and determine their own position on the map, so as to perform autonomous navigation based on the map. The accuracy and reliability of localization guarantee the safety of navigation. The robot can be accurately navigated to the target point according to the predetermined trajectory only when the localization is correct, thereby achieving various service functions. Considering the cost requirements, at present, the measurement distance of the lidar used by an indoor robot is generally within 20 meters, and single-line lidars are mostly used. In some large indoor scenes such as airports, gymnasiums, and government offices, the distance in the empty spaces of the scenes is generally more than 20 meters. If the same lidar is used, the robot can only be navigated near the edge and localized through the fixed features at the edge, while cannot be localized in the empty space.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

Figure 1:
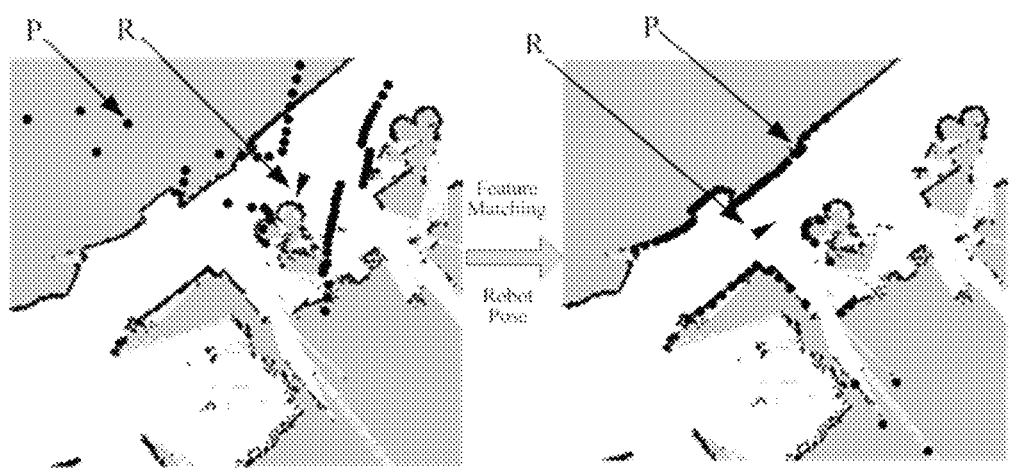
FIG. 1 is a schematic diagram of an example of matching obstacle points scanned by a lidar of a robot with feature points on a map according to an embodiment of the present disclosure.

FIG. 1 is a schematic diagram of an example of matching obstacle points scanned by a lidar of a robot with feature points on a map according to an embodiment of the present disclosure. As shown in FIG. 1, in a small indoor scene, the robot R can determine its pose (i.e., position and posture) on a map by matching obstacle points scanned through a lidar (i.e., laser radar) disposed on the robot R with feature points P on the map. However, due to the limitation of the ranging range of the lidar, the robot can only scan obstacles that are relatively close to itself. If the robot R is at a relatively empty position, there will be few or even no feature points scanned.

Figure 2:
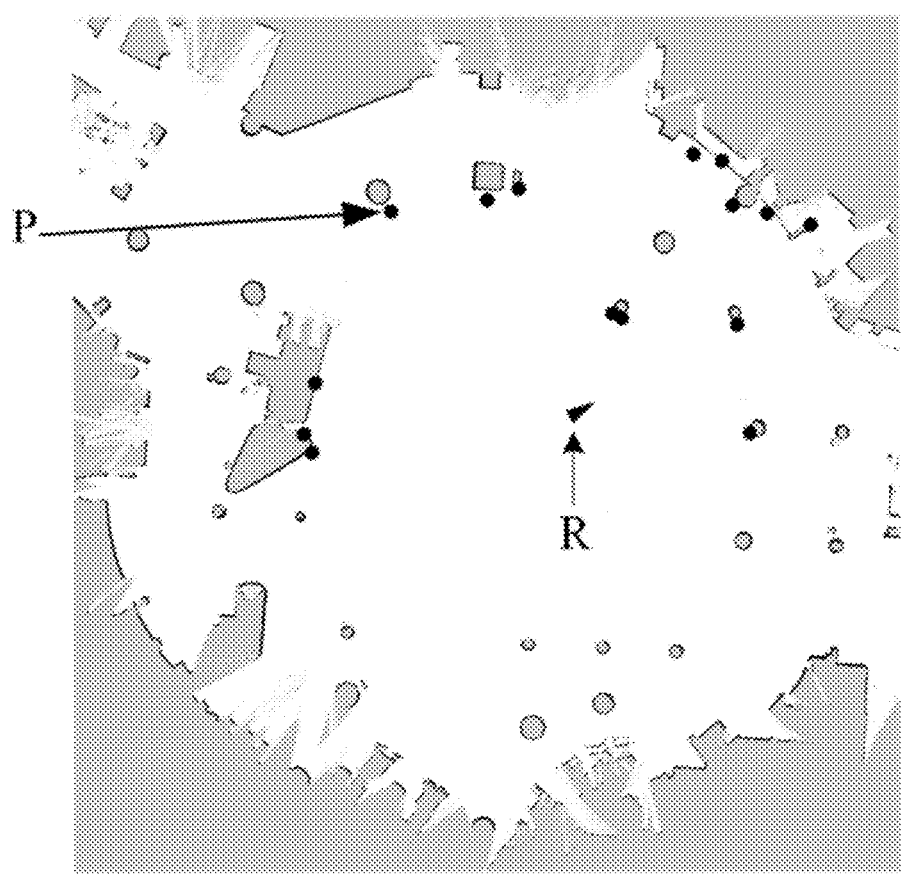
FIG. 2 is a schematic diagram of an example of a robot at an empty space of a large indoor scene according to an embodiment of the present disclosure.
Figure 3:
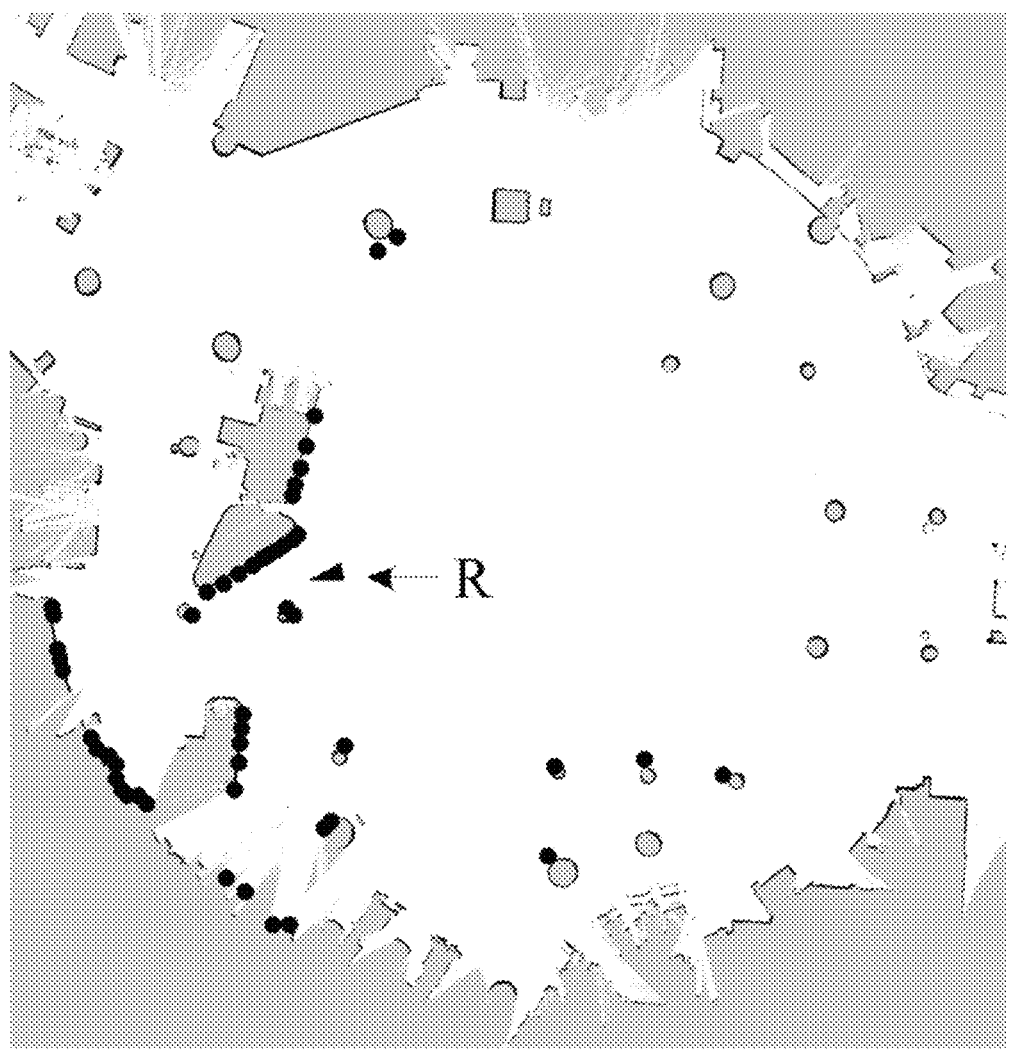
FIG. 3 is a schematic diagram of an example of a robot at an edge of a large indoor scene according to an embodiment of the present disclosure.
Figure 4:
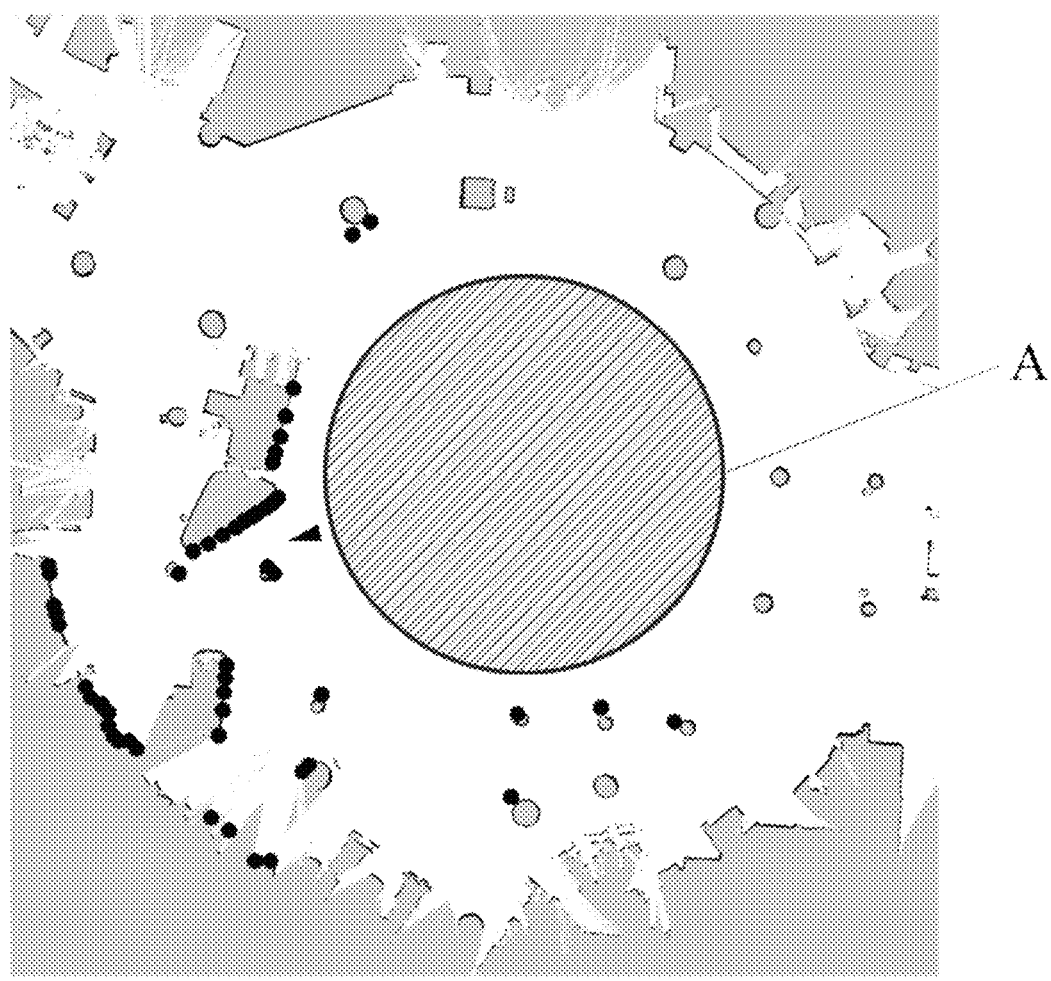
FIG. 4 is a schematic diagram of an example of a danger area for localization according to an embodiment of the present disclosure.

FIG. 2 is a schematic diagram of an example of a robot at an empty space of a large indoor scene according to an embodiment of the present disclosure; FIG. 3 is a schematic diagram of an example of a robot at an edge of a large indoor scene according to an embodiment of the present disclosure; and FIG. 4 is a schematic diagram of an example of a danger area for localization according to an embodiment of the present disclosure. As shown in FIG. 2, in the case that the robot R is at the middle of the atrium of a large shopping mall, the scanned feature points are few and there are only a few scattered points. At this time, the localization is easy to fail. However, when the robot R is at the position shown in FIG. 3, because it is close to the edge, a certain number of feature points can be scanned, and the localization robustness will be better. As shown in FIG. 4, the empty area at the middle can be defined as a "danger area for localization" A, which means that the location of the robot R is very easy to lose in this area. According to the forgoing analysis, the robot can only be navigated outside the danger area of FIG. 4. Hence, the movement area of the robot is limited. Although the safety of navigation can be improved, the navigation experience and navigation function will be greatly reduced.

There is a solution of using the large range and long distance laser radar to cover the danger area. However, the solution is neither economical nor practical, because there are actually not too many empty areas in most scenes. Instead, there are usually only one or two places that are relatively empty, while most other areas are narrow scenes such as corridors. Therefore, the long distance ranging is not often used. In view of this, in this embodiment, a particle filtering method combining lidar localization and UWB (ultra wideband) localization is proposed for localizing a robot, which is economical, practical and low cost, and can improve localization robustness and ensure navigation safety.

Figure 5:
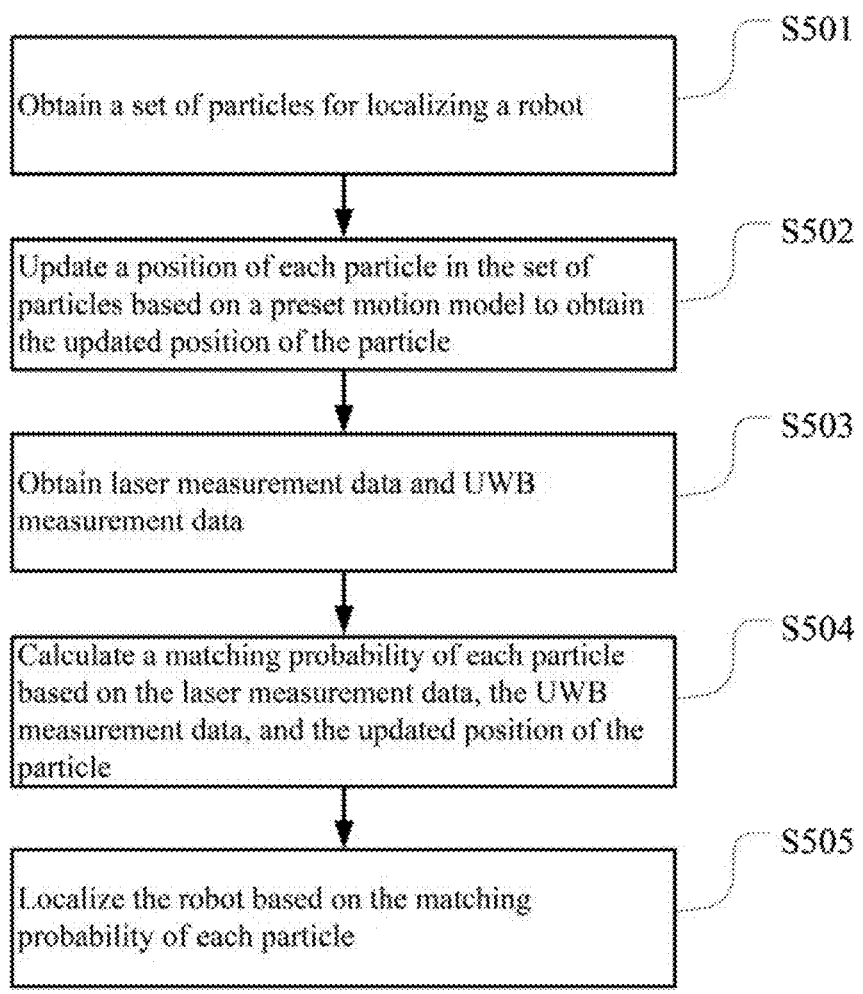
FIG. 5 is a flow chart of a robot localization method according to an embodiment of the present disclosure.
Figure 9:
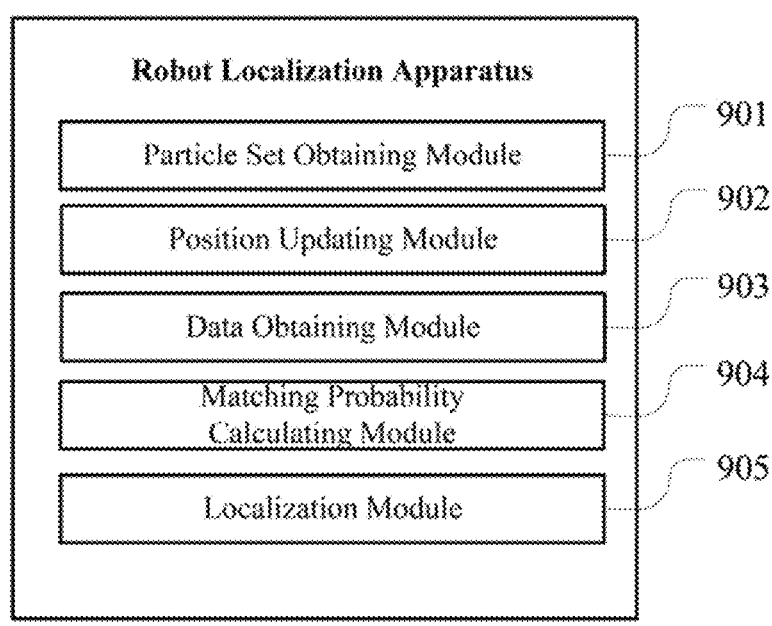
FIG. 9 is a schematic block diagram of an embodiment of a robot localization apparatus according to the present disclosure.
Figure 10:
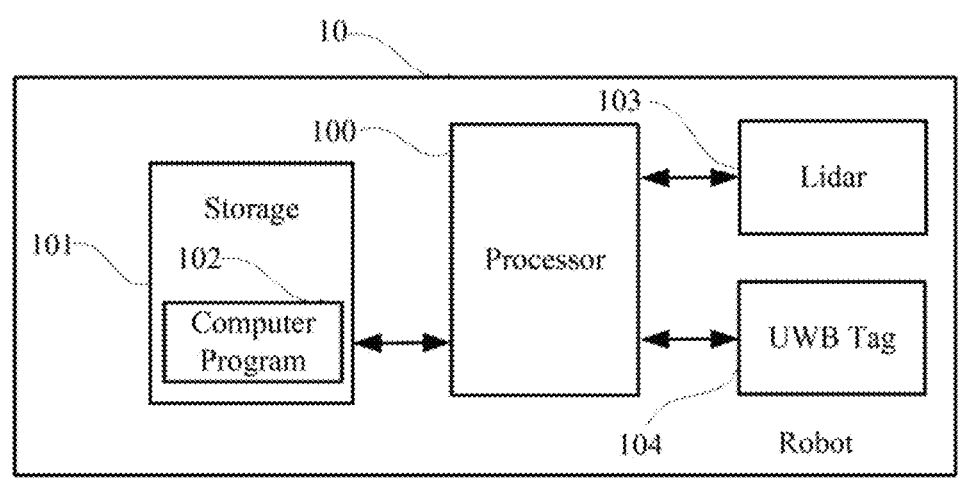
FIG. 10 is a schematic block diagram of an embodiment of a robot according to the present disclosure.

FIG. 5 is a flow chart of a robot localization method according to an embodiment of the present disclosure. In this embodiment, a localization method for a robot having a lidar and a UWB tag is provided. The method is a computer-implemented method executable for a processor, which may be implemented through and applied to a robot localization apparatus as shown in FIG. 9 or a robot as shown in FIG. 10. As shown in FIG. 5, the method includes the following steps.

S501: obtaining a set of particles for localizing the robot.

In this embodiment, the method improves the traditional particle filtering method. The so-called particle filtering refers to a process of approximately expressing the probability density function by finding a group of random samples propagating in the state space and using the sample mean to substitute the integral operation, so as to obtain the minimum variance estimation of the system state. Since these samples are called "particles" visually, it is called particle filtering.

The core idea of the perception model of the original particle filtering is based on a rangefinder (e.g., a lidar). In which, the obstacle points perceived by the rangefinder is mapped to a map through the actual pose of each particle to compare with the obstacle points on the map. The closer the distance is, the larger the probability that the pose of the particle is correct. Because in an ideal case, assuming the pose of a certain particle is the correct physical pose of the robot, at this position, the obstacle points scanned by the rangefinder in each direction will coincide with or be close to the obstacle points on the map as the laser spots shown on the right part of FIG. 1. The particle filter calculates the matching probability of a certain particle through the distances between the scanned points and the obstacle points on the map, and then the obstacle points of large probabilities are remained while that of small probabilities are eliminated in resampling processes, which similar to the genetic mechanism of fittest survive.

The set of particles is composed of a preset number of particles. In the initial state, the position of each particle in the set of particles in the map can be randomly selected. In the subsequent process, the set of particles obtained at any moment is the updated set of particles obtained by resampling the set of particles of its previous moment.

S502: updating a position of each particle in the set of particles based on a preset motion model to obtain the updated position of the particle.

That is, the position of each particle at the previous moment is calculated based on a preset motion model to estimate the position of the particle at the current moment. The specific update process can be based on the existing particle filtering algorithm, which is not repeated herein.

S503: obtaining laser measurement data and UWB measurement data.

In this embodiment, the laser measurement data is obtained through the lidar, and the UWB measurement data is obtained through the UWB tag. In empty areas, there are very few obstacles can be scanned by the lidar. If the matching probability of the particle is calculated only using a few scanned points, it is easy to cause the calculated probability distribution to be inconsistent with or even very different from the actual situation due to measurement errors or map changes so that the number of the particles in the correct position is reduced or even disappeared and the number of the particles in the wrong position is gradually increased, and eventually the localization fails.

The localization precision of UWB localization in indoor empty scenes can achieve about 0.5-1 meters. This precision still has high reference value in empty areas. Although this precision is not as good as that of the laser rangefinder, it can ensure that the localization data in the entire area is reliable and the localization deviation will not exceed 1 meter at the maximum. If the UWB data is taken into account when calculating the matching probability of the particles, most of the particles are constrained near the UWB localizing location to ensure that particles near the correct position will never disappear. When the features become more and more, the matching probability of each particle can be accurately calculated using the laser data, so as to obtain high precision poses.

S504: calculating a matching probability of each particle based on the laser measurement data, the UWB measurement data, and the updated position of the particle.

Figure 6:
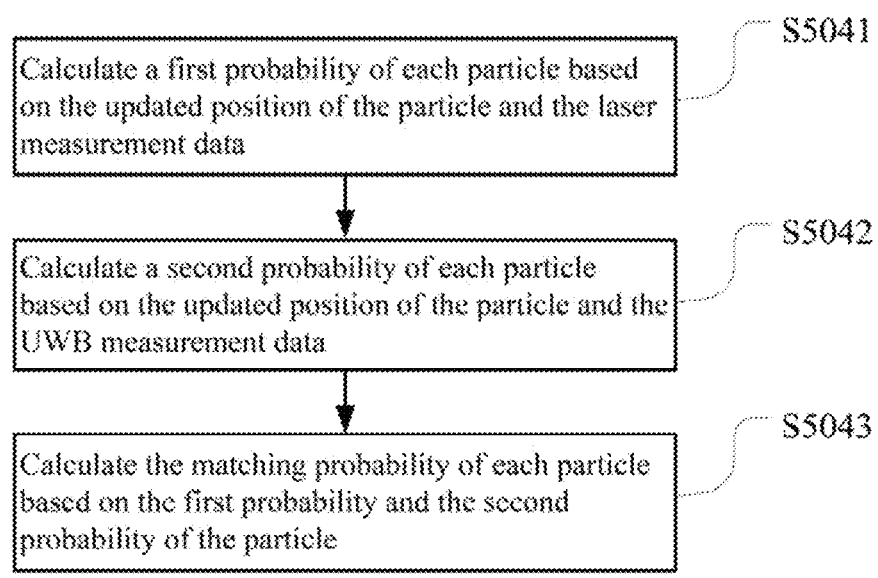
FIG. 6 is a schematic diagram of an example of a calculating a matching probability of each particle based on laser measurement data, UWB measurement data, and an updated position of the particle according to an embodiment of the present disclosure.

FIG. 6 is a schematic diagram of an example of a calculating a matching probability of each particle based on laser measurement data, UWB measurement data, and an updated position of the particle according to an embodiment of the present disclosure. As shown in FIG. 6, step S504 of the above-mentioned method may include the following steps.

S5041: calculating a first probability of each particle based on the updated position of the particle and the laser measurement data.

Take the i-th particle (1≤i≤N, where N is the number of particles in the set of particles) as an example to describe the calculation process of the first probability as follows.

First, a position of each first feature point is determined based on the laser measurement data, where the first feature point is obtained by measuring through the lidar; and determine positions of second feature points based on the updated position of the i-th particle, where the second feature points are pre-labeled in a map.

Then, a matching distance of each first feature point is calculated.

Take the j-th first feature point as an example, the distances between the j-th first feature point and each of the second feature points are calculated, and the shortest distance is selected from these distances, where this shortest distance is the matching distance of the j-th first feature point. By performing the forgoing calculation on each first feature point, the matching distance of each first feature point can be obtained.

After the matching distances of the first feature points are obtained, a first distance is calculated, where the first distance is a sum of the matching distances of the first feature points.

Finally, the first probability of the i-th particle is calculated based on the first distance, where the first probability is negatively correlated with the first distance, that is, for the i-th particle, the larger the first distance is, the more the laser measured feature points not match the feature points in the map, and the smaller the first probability is. Contrarily, the smaller the first distance is, the more the laser measured feature points match the feature points in the map, and the larger the first probability is. By performing the forgoing calculation on each particle in the set of particles, the first probability of each particle can be obtained.

S5042: calculating a second probability of each particle based on the updated position of the particle and the UWB measurement data.

Figure 7:
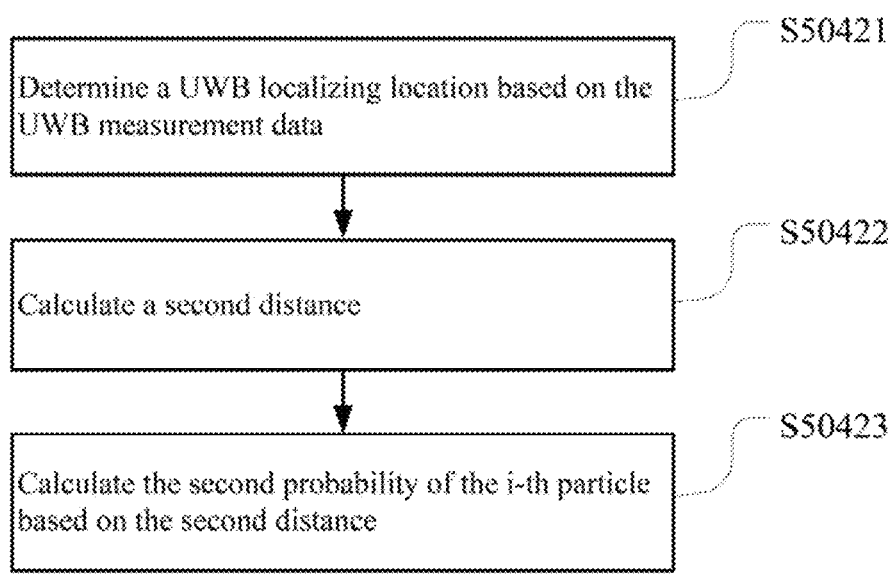
FIG. 7 is a schematic diagram of an example of calculating a second probability of each particle based on an updated position of the particle and UWB measurement data according to an embodiment of the present disclosure.

FIG. 7 is a schematic diagram of an example of calculating a second probability of each particle based on an updated position of the particle and UWB measurement data according to an embodiment of the present disclosure. As shown in FIG. 7, the calculation process of the second probability is described by taking the i-th particle as an example:

S50421: determining a UWB localizing location based on the UWB measurement data.

In this embodiment, the UWB measurement data can be calculated using a preset localization algorithm, thereby obtaining the UWB localizing location. The localization algorithm includes, but is not limited to, a localization algorithm based on the angle of arrival (AOA), a localization algorithm based on the time of arrival (TOA), and a localization algorithm based on the time difference of arrival (TDOA), a localization algorithm based on the received signal strength (RSS), and various combinations of these localization algorithms.

S50422: calculating a second distance.

In which, the second distance is a distance between the updated position of the i-th particle and the UWB localizing location.

In this embodiment, the updated position of the i-th particle can be marked as $Pos_i=(x_i, y_i)$, the UWB localizing location is marked as $Pos_u=(x_u, y_u)$, the second distance is marked as $d_i$, and the second distance can be calculated based on the formula of $d_i=\sqrt{(x_i-x_u)^2+(y_i-y_u)^2}$.

S50423: calculating the second probability of the i-th particle based on the second distance.

In which, the second probability is negatively correlated with the second distance, that is, for the i-th particle, the larger the second distance is, the smaller the second probability is; contrarily, the smaller the second distance is, the larger the second probability is.

Figure 8:
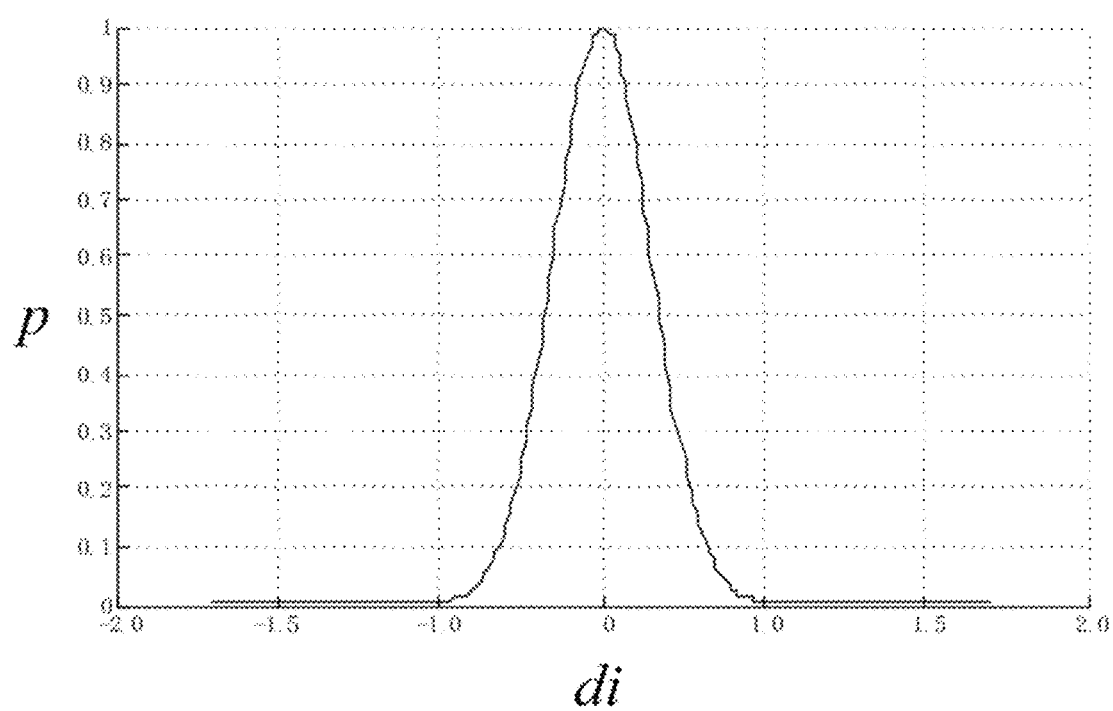
FIG. 8 is a schematic diagram of an example of the distribution of matching probabilities of particles according to an embodiment of the present disclosure.

In a specific implementation of this embodiment, the second probability of the i-th particle can be calculated based on the following formula:

$$p_u = \frac{1}{\sqrt{2\pi}\,\sigma}\exp\left(-\frac{d_i^2}{2\sigma^2}\right);$$

where, $p_u$ is the second probability of the i-th particle, and $\sigma$ is the normal distributed standard deviation. FIG. 8 is a schematic diagram of an example of the distribution of matching probabilities of particles according to an embodiment of the present disclosure. As shown in FIG. 8, di represents the distance between the position of the i-th particle and the position of the robot obtained by UWB localization, and p represents the "second probability" of the i-th particle. According to the 3σ principle of the normal distribution, since the precision error of UWB localization is less than 1 meter, it can be set $\sigma=0.3333$ to constrain the particles to be within a 1 meter range near the UWB localizing location, and its probability distribution is as shown in FIG. 8.

By performing the forgoing calculation on each particle in the set of particles, the second probability of the particle can be obtained.

S5043: calculating the matching probability of each particle based on the first probability and the second probability of the particle.

Taking the i-th particle as an example, a sum of the first probability of the i-th particle and the second probability of the i-th particle is determined as the matching probability of the i-th particle. That is, when calculating the matching probability of a particle, based on the probability $p_i$ originally calculated using the laser data, the probability $p_u$ constrained by the UWB localizing location is employed. In this way, when there is no laser data, the particles will be distributed around the UWB localizing location with the probability shown in FIG. 8; and when the laser data is abundant, the laser data can be used to precisely adjust the position of the particles after constrained by the UWB localizing location. That is, in empty areas UWB localization is mainly used with the auxiliary of laser localization; and in non-empty areas, laser localization is mainly used with the auxiliary of UWB localization, where the two are complementary in their advantages.

S505: localizing the robot based on the matching probability of each particle.

The localization process is similar to the existing localization process using the particle filtering algorithm, and the details are not described herein.

The forgoing process only completes one localization and tracking. In order to facilitate the next localization and tracking, after calculating the matching probability of each particle separately, it can also resample the particles according to the matching probabilities of the particles to obtain the updated set of particles for the next localization and tracking.

Resampling is a phase for concentrating and updating the particles. During the resampling phase, the particles will be duplicated with the matching probability ($p_i+p_{i,t}$). The particles with a large matching probability also have a large duplication probability, and can even be duplicated multiple times; and the particles with a small matching probability have a small duplication probability, and may even disappear without being duplicated, which similar to the genetic mechanism of fittest survive.

In addition to the genetic mechanism described above, in an implementation of this embodiment, a mutation mechanism can also be introduced. In particle filtering, the mutation mechanism is mainly for performing the recovery after localization failure. In some cases, the particles near the correct position may all disappear. The genetic mechanism can only select the particles with the largest matching probability among the existing particles. If the position of the particle with the highest matching probability is wrong, no matter how it is filtered, the particle at the correct position cannot be obtained. At this time, it needs to solve through the mutation mechanism, that is, to generate several random particles on the map. If a certain particle happens to be near to the correct position of the robot, the particle will be duplicated with a large probability when it is resampled, and it will gradually reproduced so that the localization of the robot be recovered to the correct position. If there is no UWB localizing location, it can only try to recover through the above-mentioned random mutation mechanism. This purposeless random mutation mechanism will make the recovery of the localization uncontrollable, and the recovery time of the localization may be very long.

However, in this embodiment, by employing the UWB localizing location, the mutation mechanism can be made more purposeful, and the recovery of the localization can be made faster and more accurate. Therefore, in this embodiment, after resampling according to the matching probability of each particle to obtain the updated set of particles, it can further generate new particles at the UWB localizing location at a preset ratio. The direction of the particles can be provided by the UWB historical localization information, and the generated new particles can be added to the updated set of particles. By generating "random" particles at the UWB localizing location, the recovery of the localization becomes completely controllable, and the speed of the recovery of the localization can be greatly accelerated.

In summary, in this embodiment, the robot localization method is realized by obtaining a set of particles for localizing the robot; updating a position of each particle in the set of particles based on a preset motion model to obtain the updated position of the particle; obtaining laser measurement data and UWB measurement data; calculating a matching probability of each particle based on the laser measurement data, the UWB measurement data, and the updated position of the particle; and localizing the robot based on the matching probability of each particle. In such a manner, the UWB measurement data is applied to the traditional particle filtering localization algorithm based on laser measurement data so as to enhance the localization precision in large indoor scenes, thereby ensuring that the robot can perform reliable localization regardless of whether it is at the edge or the empty space of large indoor scenes.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 9 is a schematic block diagram of an embodiment of a robot localization apparatus according to the present disclosure. A localization apparatus for a robot is provided, which corresponds to the robot localization method described in the forgoing embodiment. As shown in FIG. 9, in this embodiment, the localization apparatus includes:

a particle set obtaining module 901 configured to obtain a set of particles for localizing the robot;

a position updating module 902 configured to update a position of each particle in the set of particles based on a preset motion model to obtain the updated position of the particle;

a data obtaining module 903 configured to obtain laser measurement data and UWB measurement data;

a matching probability calculating module 904 configured to calculate a matching probability of each particle based on the laser measurement data, the UWB measurement data, and the updated position of the particle; and a localization module 905 configured to localize the robot based on the matching probability of each particle.

Furthermore, the matching probability calculating module 904 may include:

a first probability calculating submodule configured to calculate a first probability of each particle based on the updated position of the particle and the laser measurement data;

a second probability calculating submodule configured to calculate a second probability of each particle based on the updated position of the particle and the UWB measurement data; and a matching probability calculating submodule configured to calculate the matching probability of each particle based on the first probability and the second probability of the particle.

Furthermore, the first probability calculating submodule may include:

a first feature point position determining unit configured to determine a position of each first feature point based on the laser measurement data, wherein the first feature point is obtained by measuring;

a second feature point position determining unit configured to determine positions of second feature points based on the updated position of the i-th particle, wherein the second feature points are pre-labeled in a map, where $1 \leq i \leq N$, and N is an amount of particles in the set of particles;

a matching distance calculating unit configured to calculate a matching distance of each first feature point, wherein the matching distance of the j-th first feature point is a shortest distance among distances between the j-th first feature point and each of the second feature points, where $1 \leq j \leq J$, and J is an amount of the first feature points;

a first distance calculating unit configured to calculate a first distance, wherein the first distance is a sum of the matching distances of the first feature points; and a first probability calculating unit configured to calculate the first probability of the i-th particle based on the first distance, wherein the first probability is negatively correlated with the first distance.

Furthermore, the second probability calculating submodule may include:

a UWB localizing location determining unit configured to determine a UWB localizing location based on the UWB measurement data;

a second distance calculating unit configured to calculate a second distance, wherein the second distance is a distance between the updated position of the i-th particle and the UWB localizing location, where $1 \le i \le N$, and N is an amount of particles in the set of particles; and a second probability calculating unit configured to calculate the second probability of the i-th particle based on the second distance, wherein the second probability is negatively correlated with the second distance.

Furthermore, the matching probability calculating sub-module is configured to:

determine a sum of the first probability of the i-th particle and the second probability of the i-th particle as the matching probability of the i-th particle, where $1 \le i \le N$, and N is an amount of particles in the set of particles.

Furthermore, the robot localization apparatus may further include:

a resampling module configured to resample the set of particles based on the matching probability of each particle to obtain the updated set of particles.

Furthermore, the robot localization apparatus may further include:

a mutation module configured to generate new particles at the UWB localizing location at a preset ratio, and adding the generated new particles to the updated set of particles.

In this embodiment, each of the above-mentioned modules/units is implemented in the form of software, which can be computer program(s) stored in a memory of the robot localization apparatus and executable on a processor of the robot localization apparatus. In other embodiments, each of the above-mentioned modules/units may be implemented in the form of hardware (e.g., a circuit of the robot localization apparatus which is coupled to the processor of the robot localization apparatus) or a combination of hardware and software (e.g., a circuit with a single chip microcomputer).

Those skilled in the art may clearly understand that, for the convenience and simplicity of description, for the specific operation process of the above-mentioned apparatus (or devices), modules and units, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

FIG. 10 is a schematic block diagram of an embodiment of a robot according to the present disclosure. A robot such as a mobile robot is provided. For convenience of explanation, only parts related to this embodiment are shown.

As shown in FIG. 10, in this embodiment, the robot 10 includes a processor 100, a storage 101, a computer program 102 stored in the storage 101 and executable on the processor 100, a lidar 103, and a UWB tag 104. When executing (instructions in) the computer program 102, the processor 100 implements the steps in the above-mentioned embodiments of the robot localization method, for example, steps S501-S505 shown in FIG. 5. Alternatively, when the processor 100 executes the (instructions in) computer program 102, the functions of each module/unit in the above-mentioned device embodiments, for example, the functions of the modules 901-905 shown in FIG. 9 are implemented.

Exemplarily, the computer program 102 may be divided into one or more modules/units, and the one or more modules/units are stored in the storage 101 and executed by the processor 100 to realize the present disclosure. The one or more modules/units may be a series of computer program instruction sections capable of performing a specific function, and the instruction sections are for describing the execution process of the computer program 102 in the robot 10.

It can be understood by those skilled in the art that FIG. 10 is merely an example of the robot 10 and does not constitute a limitation on the robot 10, and may include more or fewer components than those shown in the figure, or a combination of some components or different components. For example, the robot 10 may further include an input/output device, a network access device, a bus, and the like.

The processor 100 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 101 may be an internal storage unit of the robot 10, for example, a hard disk or a memory of the robot 10. The storage 101 may also be an external storage device of the robot 10, for example, a plug-in hard disk, a smart media card (SMC), a secure digital (SD) card, flash card, and the like, which is equipped on the robot 10. Furthermore, the storage 101 may further include both an internal storage unit and an external storage device, of the robot 10. The storage 101 is configured to store the computer program 102 and other programs and data required by the robot 10. The storage 101 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplicative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented localization method for a robot, comprising executing on a processor steps of:
   obtaining a set of particles for localizing the robot;
   updating a position of each particle in the set of particles based on a preset motion model to obtain the updated position of the particle;
   obtaining laser measurement data and UWB measurement data;
   calculating a matching probability of each particle based on the laser measurement data, the UWB measurement data, and the updated position of the particle; and
   localizing the robot based on the matching probability of each particle;
   wherein the step of calculating the matching probability of each particle based on the laser measurement data, the UWB measurement data, and the updated position of the particle comprises:
     calculating a first probability of each particle based on the updated position of the particle and the laser measurement data;
     calculating a second probability of each particle based on the undated position of the particle and the UWB measurement data; and
     calculating the matching probability of each particle based on the first probability and the second probability of the particle; and
   wherein the step of calculating the first probability of each particle based on the updated position of the particle and the laser measurement data comprises:
     determining a position of each first feature point based on the laser measurement data, wherein the first feature point is obtained by measuring;
     determining positions of second feature points based on the updated position of the i-th particle, wherein the second feature points are pre-labeled in a map, where $1 \le i \le N$, and N is an amount of particles in the set of particles;
     calculating a matching distance of each first feature point, wherein the matching distance of the j-th first feature point is a shortest distance among distances between the j-th first feature point and each of the second feature points, where $1 \le j \le J$, and J is an amount of the first feature points;
     calculating a first distance, wherein the first distance is a sum of the matching distances of the first feature points; and
     calculating the first probability of the i-th particle based on the first distance, wherein the first probability is negatively correlated with the first distance.

2. The method of claim 1, wherein the step of calculating the second probability of each particle based on the updated position of the particle and the UWB measurement data comprises:
   determining a UWB localizing location based on the UWB measurement data;
   calculating a second distance, wherein the second distance is a distance between the updated position of the i-th particle and the UWB localizing location, where $1 \le i \le N$, and N is an amount of particles in the set of particles; and
   calculating the second probability of the i-th particle based on the second distance, wherein the second probability is negatively correlated with the second distance.

3. The method of claim 1, wherein the step of calculating the matching probability of each particle based on the first probability and the second probability of the particle comprises:
 determining a sum of the first probability of the i-th particle and the second probability of the i-th particle as the matching probability of the i-th particle, where $1 \leq i \leq N$, and N is an amount of particles in the set of particles.

4. The method of claim 1, wherein after the step of calculating the matching probability of each particle based on the laser measurement data, the UWB measurement data, and the updated position of the particle further comprises:
 resampling the set of particles based on the matching probability of each particle to obtain the updated set of particles.

5. The method of claim 4, wherein the step of resampling the set of particles based on the matching probability of each particle to obtain the updated set of particles comprises:
 generating new particles at the UWB localizing location at a preset ratio, and adding the generated new particles to the updated set of particles.

6. A localization apparatus for a robot, comprising:
 a particle set obtaining module configured to obtain a set of particles for localizing the robot;
 a position updating module configured to update a position of each particle in the set of particles based on a preset motion model to obtain the updated position of the particle;
 a data obtaining module configured to obtain laser measurement data and UWB measurement data;
 a matching probability calculating module configured to calculate a matching probability of each particle based on the laser measurement data, the UWB measurement data, and the updated position of the particle; and
 a localization module configured to localize the robot based on the matching probability of each particle;
 wherein the matching probability calculating module comprises:
  a first probability calculating submodule configured to calculate a first probability of each particle based on the updated position of the particle and the laser measurement data;
  a second probability calculating submodule configured to calculate a second probability of each particle based on the updated position of the particle and the UWB measurement data; and
  a matching probability calculating submodule configured to calculate the matching probability of each particle based on the first probability and the second probability of the particle; and
 wherein the first probability calculating submodule comprises:
  a first feature point position determining unit configured to determine a position of each first feature point based on the laser measurement data, wherein the first feature point is obtained by measuring;
  a second feature point position determining unit configured to determine positions of second feature points based on the updated position of the i-th particle, wherein the second feature points are pre-labeled in a map, where $1 \leq i \leq N$, and N is an amount of particles in the set of particles;
  a matching distance calculating unit configured to calculate a matching distance of each first feature point, wherein the matching distance of the j-th first feature point is a shortest distance among distances between the j-th first feature point and each of the second feature points, where $1 \leq j \leq J$, and J is an amount of the first feature points;
  a first distance calculating unit configured to calculate a first distance, wherein the first distance is a sum of the matching distances of the first feature points; and
  a first probability calculating unit configured to calculate the first probability of the i-th particle based on the first distance, wherein the first probability is negatively correlated with the first distance.

7. The localization apparatus of claim 6, wherein the second probability calculating submodule comprises:
 a UWB localizing location determining unit configured to determine a UWB localizing location based on the UWB measurement data;
 a second distance calculating unit configured to calculate a second distance, wherein the second distance is a distance between the updated position of the i-th particle and the UWB localizing location, where $1 \leq i \leq N$, and N is an amount of particles in the set of particles; and
 a second probability calculating unit configured to calculate the second probability of the i-th particle based on the second distance, wherein the second probability is negatively correlated with the second distance.

8. The localization apparatus of claim 6, wherein the matching probability calculating submodule is further configured to:
 determine a sum of the first probability of the i-th particle and the second probability of the i-th particle as the matching probability of the i-th particle, where $1 \leq i \leq N$, and N is an amount of particles in the set of particles.

9. The localization apparatus of claim 6, further comprising:
 a resampling module configured to resample the set of particles based on the matching probability of each particle to obtain the updated set of particles.

10. The localization apparatus of claim 9, further comprising:
 a mutation module configured to generate new particles at the UWB localizing location at a preset ratio, and adding the generated new particles to the updated set of particles.

11. A robot, comprising:
 a lidar configured to collect laser measurement data;
 a UWB tag configured to collect UWB measurement data;
 a memory;
 a processor; and
 one or more computer programs stored in the memory and executable on the processor, wherein the one or more computer programs comprise:
 instructions for obtaining a set of particles for localizing the robot;
 instructions for updating a position of each particle in the set of particles based on a preset motion model to obtain the updated position of the particle;
 instructions for obtaining the laser measurement data and the UWB measurement data;
 instructions for calculating a matching probability of each particle based on the laser measurement data, the UWB measurement data, and the updated position of the particle; and
 instructions for localizing the robot based on the matching probability of each particle;
 wherein the instructions for calculating the matching probability of each particle based on the laser measurement data, the UWB measurement data, and the updated position of the particle comprise:
  instructions for calculating a first probability of each particle based on the updated position of the particle and the laser measurement data;
  instructions for calculating a second probability of each particle based on the updated position of the particle and the UWB measurement data; and
  instructions for calculating the matching probability of each particle based on the first probability and the second probability of the particle; and
wherein the instructions for calculating the first probability of each particle based on the updated position of the particle and the laser measurement data comprise:
  instructions for determining a position of each first feature point based on the laser measurement data, wherein the first feature point is obtained by measuring;
  instructions for determining positions of second feature points based on the updated position of the i-th particle, wherein the second feature points are pre-labeled in a map, where $1 \leq i \leq N$, and N is an amount of particles in the set of particles;
  instructions for calculating a matching distance of each first feature point, wherein the matching distance of the j-th first feature point is a shortest distance among distances between the j-th first feature point and each of the second feature points, where $1 \leq j \leq J$, and J is an amount of the first feature points;
  instructions for calculating a first distance, wherein the first distance is a sum of the matching distances of the first feature points; and
  instructions for calculating the first probability of the i-th particle based on the first distance, wherein the first probability is negatively correlated with the first distance.

12. The robot of claim 11, wherein the instructions for calculating the second probability of each particle based on the updated position of the particle and the UWB measurement data comprise:
  instructions for determining a UWB localizing location based on the UWB measurement data;
  instructions for calculating a second distance, wherein the second distance is a distance between the updated position of the i-th particle and the UWB localizing location, where $1 \leq i \leq N$, and N is an amount of particles in the set of particles; and
  instructions for calculating the second probability of the i-th particle based on the second distance, wherein the second probability is negatively correlated with the second distance.

13. The robot of claim 11, wherein the instructions for calculating the matching probability of each particle based on the first probability and the second probability of the particle comprise:
  instructions for determining a sum of the first probability of the i-th particle and the second probability of the i-th particle as the matching probability of the i-th particle, where $1 \leq i \leq N$, and N is an amount of particles in the set of particles.

14. The robot of claim 11, wherein one or more computer programs further comprise:
  instructions for resampling the set of particles based on the matching probability of each particle to obtain the updated set of particles.

15. The robot of claim 14, wherein the instructions for resampling the set of particles based on the matching probability of each particle to obtain the updated set of particles comprise:
  instructions for generating new particles at the UWB localizing location at a preset ratio, and adding the generated new particles to the updated set of particles.

* * * * *